United States Patent [19]

Golker

[11] 4,406,939
[45] Sep. 27, 1983

[54] METHOD FOR THE MANUFACTURE OF A CODE DISK FOR OPTICAL INCREMENTAL SHAFT ENCODERS AND ABSOLUTE SHAFT ENCODERS

[75] Inventor: Walter Golker, Munich, Fed. Rep. of Germany

[73] Assignee: Siemens Aktiengesellschaft, Berlin & Munich, Fed. Rep. of Germany

[21] Appl. No.: 285,432

[22] Filed: Jul. 20, 1981

[30] Foreign Application Priority Data

Sep. 24, 1980 [DE] Fed. Rep. of Germany ....... 3036005

[51] Int. Cl.³ .............................................. B23K 26/00
[52] U.S. Cl. ........................ 219/121 LJ; 219/121 LH; 346/76 L
[58] Field of Search ................. 219/121 LG, 121 LH, 219/121 LJ, 121 LM, 121 LN, 121 LU, 121 LV, 121 LW, 121 LY, 121 LZ, 121 LK; 346/76 L, 2; 356/138; 318/602

[56] References Cited

U.S. PATENT DOCUMENTS

| | | | |
|---|---|---|---|
| 3,436,510 | 4/1969 | Fyler | 219/69 R |
| 3,843,915 | 10/1974 | Helmbold | 318/602 |
| 4,032,743 | 6/1977 | Erbach et al. | 219/121 LK |
| 4,038,663 | 7/1977 | Day et al. | 219/121 LH |
| 4,190,759 | 2/1980 | Hongo et al. | 219/121 LU |

Primary Examiner—Bruce A. Reynolds
Assistant Examiner—Alfred S. Keve
Attorney, Agent, or Firm—Hill, Van Santen, Steadman & Simpson

[57] ABSTRACT

A method for manufacturing a code disk for devices such as optical incremental shaft encoders and absolute shaft encoders employs the step of first assembling a code disk which is to be inscribed with a selected code pattern on a mounted shaft, prior to the inscription of the code pattern. The code pattern is subsequently inscribed on the surface of the code disk with a laser beam transmitter as the disk rotates about the shaft. The code disk is precisely positioned in relation to the laser beam transmitter by an angular step control device and the code pattern on the code disk is also precisely positioned with respect to the mounting location in the central area of the code disk.

4 Claims, 3 Drawing Figures

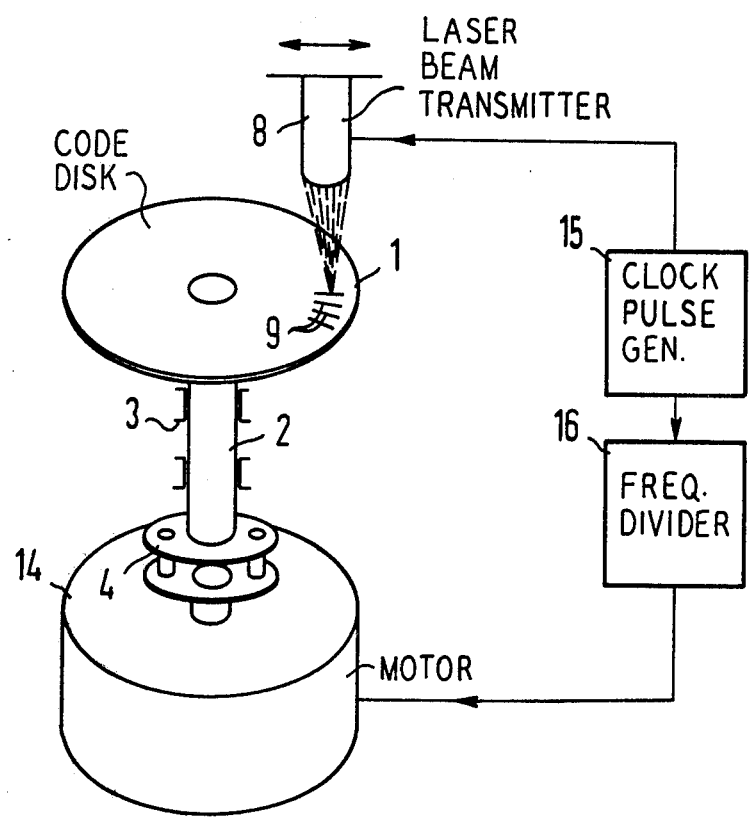

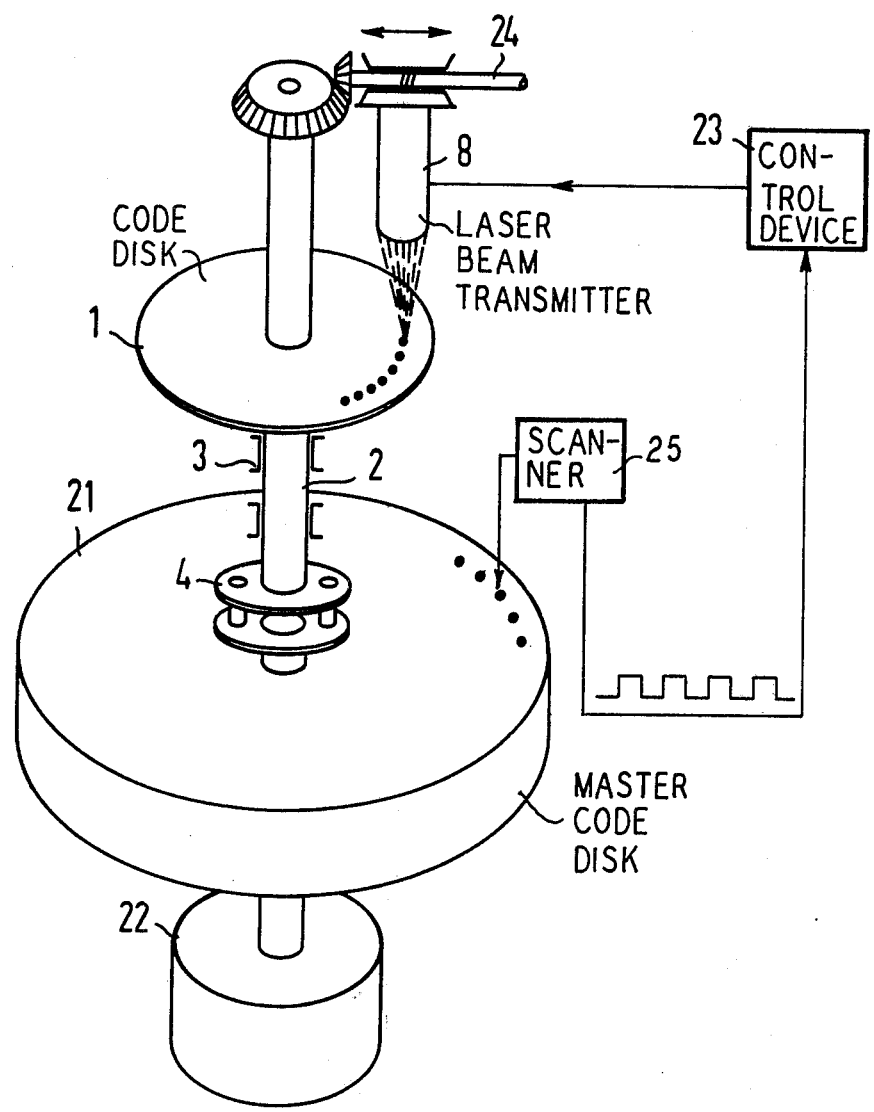

METHOD FOR THE MANUFACTURE OF A CODE DISK FOR OPTICAL INCREMENTAL SHAFT ENCODERS AND ABSOLUTE SHAFT ENCODERS

BACKGROUND OF THE INVENTION

The present invention relates to a method for manufacturing a code disk for use in devices such as an optical incremenal shaft encoder or an absolute shaft encoder, and in particular to such a method wherein light-transmissive code pattern marks are generated on the disk by removal of a selected portion of an opaque layer applied to the code disk and wherein the pattern thus produced on the code disk is centered exactly relative to a shaft supporting the code disk.

Optical incremental shaft encoders and absolute shaft encoders known to those skilled in the art conventionally employ a code disk having an annular code pattern in the form of short lines or slits on the surface of the code disk. The code pattern is copied from a master by photographic means and manufactured on the code disk by a partial etching of an opaque disk which is applied on a light-transmissive disk. Other methods of manufacturing the code pattern on the code disk are known in which the pattern is generated by means of photographic recording and by conventional electro-galvanic means.

In all known methods of manufacturing a code disk, the code pattern is first generated on the disk and the disk is subsequently mounted in the device in which it is to be used. For this purpose, the code pattern produced on the disk must be subsequently centered by special measures such as, for example, by the use of a precision center bore or a light-transmissive centering circle. During assembly of the code disk on a mounted shaft, the code pattern must be exactly centered, requiring a high time outlay.

SUMMARY OF THE INVENTION

It is an object of the present invention to provide a method for manufacturing a code disk which avoids the high time outlay for centering of the disk but which still guarantees a precise centric bearing of the code disk.

The above object is inventively achieved in a method for manufacturing a code disk which has an opaque layer thereon wherein the code disk is first connected with the shaft on which it is to be mounted and, by means of a laser beam transmitter, the code pattern is inscribed on the opaque layer, whereby the laser beam transmitter is positioned relative to the mounting shaft via an angular step control.

Thus, instead of the subsequent centering steps employed in conventional manufacturing methods, the code disk manufactured in accordance with the principles of the present invention is, prior to the generation of the code pattern, connected to the mounting shaft so that the code pattern is produced on the disk which is already mounted. This is possible by the generation of the code pattern by means of a laser beam. The treatment of the code disk in photographic or electroplating baths, such as is required in conventional manufacturing methods, is not necessary with the inventive method and, moreover, such treatment would be problematical, if not impossible, with a disk which is already attached to a mounting shaft.

In the simplest embodiment of the invention, the shaft with the code disk attached thereto is connected to an angular measuring device and, prior to each activation of the laser beam gun for generating a line in the code pattern, the code disk is brought to a specified angular position. In a further embodiment of this method, the laser beam gun is operated with a specific clock pulse frequency and the shaft supporting the code disk is driven with a motor controlled in dependence upon this clock pulse frequency. In a further embodiment of the method a pattern-code master disk is coupled with the shaft to which the code disk to be inscribed is attached, and the code pattern on the master is sampled and the laser beam gun is actuated in accordance with the sampled code pattern.

DESCRIPTION OF THE DRAWINGS

FIG. 2 is a second embodiment of the method represented in FIG. 1 employing a clock pulse control for rotating the code disk and operating the laser beam gun.

FIG. 3 is a further embodiment of a method for manufacturing a code disk in accordance with the principles of the present invention employing sampling of a pattern-code disk to position the code disk to be inscribed.

DESCRIPTION OF THE PREFERRED EMBODIMENTS

Figure 1:
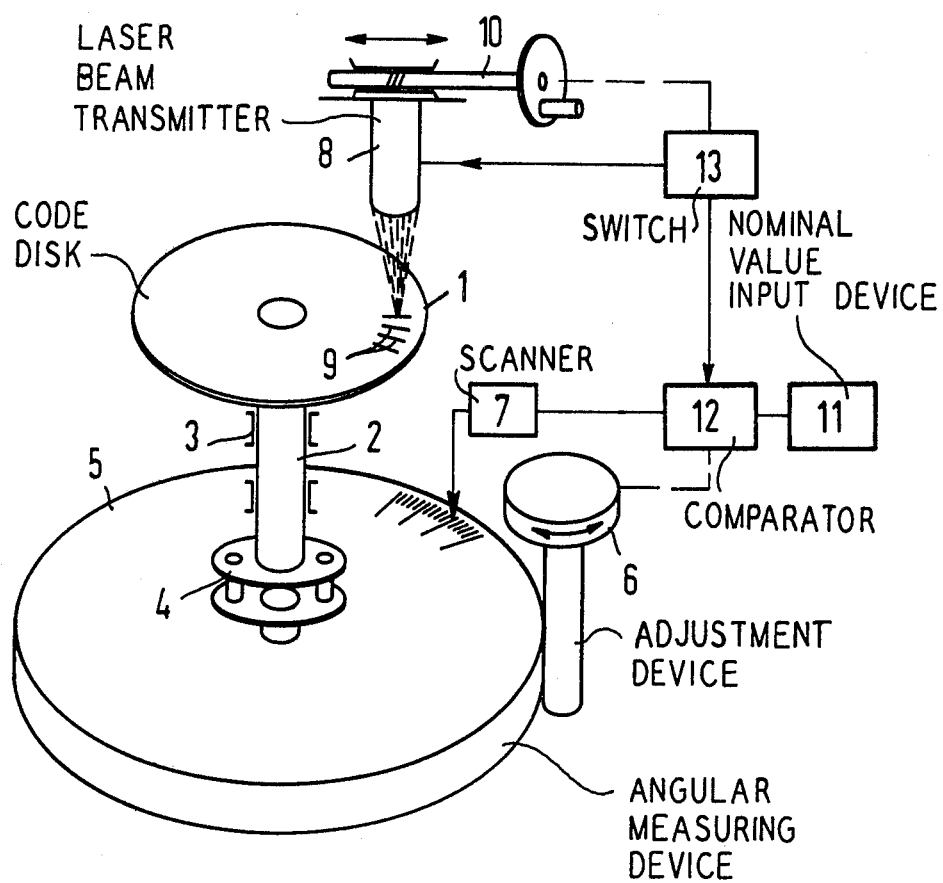
FIG. 1 is a perspective view, with schematically represented electronics, of the method for manufacturing a code disk in accordance with the principles of the present invention utilizing an angular position device.

An apparatus operating in accordance with the inventive method disclosed herein for manufacturing a code disk for use in optical annular incremental encoders and similar devices is shown in FIG. 1. A code disk 1 to be inscribed is coated with an opaque layer. The code disk 1 may, for example, be a glass disk with nickel vapor-deposited thereon. A code pattern 9 is to be inscribed on the surface of the code disk 1 by a partial removal of selected portions of the opaque layer. The code pattern 9 must be precisely centrically disposed relative to the rotational axis of the code disk 1, which will be used to rotate the code disk in the device in which it is subsequently employed. For this purpose, the code disk 1 is first mounted on a shaft 2 with only coarse precision. The shaft 2 is rotatably supported by bearings 3. The shaft 2 with the code disk 1 is connected by means of a coupling 4 with a high resolution angular measurement device 5 of the type which is known to those skilled in the art. The angular measuring device 5 can be precisely adjusted by an adjustment device 6 to specific angular positions, the respective angular position being measured by a sampling device or scanner 7. The coding of the code disk 1 proceeds by means of a laser beam gun 8 which is disposed in a suitable manner above the code disk 1. The laser beam produced by the gun 8 inscribes the code pattern 9 on the disk 1 by burning away selected portions of the opaque layer. In order to produce a line forming a portion of the pattern 9, the laser beam gun 8 can be shifted by a suitable displacement device 10. In the embodiment shown in FIG. 1 a threaded feed device is shown, however, it will be understood that any suitable device known to those skilled in the art may be employed.

A random angular position at which a code mark in the code pattern 9 is to be produced can be selected by the nominal value input device 11. The selected nominal value is compared with the actual angular position, supplied by the scanner 7, in a comparator 12. If the measured angular position agrees with the nominal value, the laser beam gun 8 is operated by means of a switch 13. The switch 13 may, for example, be a monostable switch which activates the laser beam gun 8 for a designated period of time. The longitudinal displacement device 10 can also be controlled through the switch 13.

The adjustment device 6 may, for example, be manually operated, however, the angular measuring device 5 may be rotated by a motor which operates, in dependence upon the comparator 12, until the adjusted nominal value is attained. In practice the nominal value is increased step-by-step. Thus, the angular measuring device 5 and the code disk 1 coupled thereto, are incrementally rotated by one angular step at a time. With each incremental angular change in position, a code mark can be inscribed on the code disk 1.

A further embodiment for carrying out the inventive method disclosed herein is shown in FIG. 2. In place of the angular measurement device employed in FIG. 1, the embodiment of FIG. 2 employs a motor 14 which is directly coupled through the coupling 4 to the shaft 2 and the code disk 1. A clock pulse generator 15 operates the laser beam gun 8, and the motor and thus the rotation of the code disk 1 are also controlled by the same clock pulse generator 15. The motor 14 can be a uniformly running synchronous motor or a stepping motor. In order to determine the motor speed, the motor operating frequency is derived from the clock pulse generator 15 by a frequency divider 16. By means of selected variation of the division ratio for the operating frequency of the motor 14, marks constituting the code pattern 9 can be produced on the code disk 1 at varying incremental distances from adjacent marks.

A further embodiment for undertaking the inventive method disclosed herein is shown in FIG. 3. As in the previous embodiments, the code disk 1 is mounted on the shaft 2 prior to inscription of the code pattern thereon. The shaft 2 in this embodiment, however, is connected through the coupling 4 with a pattern-code master disk 21 which is rotated by a motor 22 connected thereto. A sampling device or scanner 25 samples the code pattern on the master code disk in individual marks and transmits the sampled data, in the form of a bit pattern, to a control device 23 for operating the laser beam transmitter 8. Thus the laser beam is always switched on when a light-transmissive location is present on the master disk 21. The code pattern of the master disk is thus precisely copied on the code disk 1 and, moreover, is inscribed thereon in a precise relation to the rotational axis of the code disk 1.

In the embodiment shown in FIG. 3 the motor 22 may, for example, be operated at varying rotational speeds. A displacement device 24, shown in FIG. 3 in the form of a bevel gear, is coupled with an extension of the shaft 2 so that the laser beam transmitter 8 can be radially shifted in relation to the rotational axis of the code disk 1 in dependence on the rotational speed of the motor 22, the master code disk 21 and the code disk 1.

Although modifications and changes may be suggested by those skilled in the art it is the intention of the inventor to embody within the patent warranted hereon all changes and modifications as reasonably and properly come within the scope of his contribution to the art.

I claim as my invention:

1. A method for manufacturing a code disk for optical incremental shaft encoders or absolute shaft encoders from a blank code disk having an opaque layer thereon, comprising the steps of:

connecting a center portion of said blank code disk in fixed relation to a rotatable shaft which is to be subsequently used for rotating said code disk in said encoder;

rotating said shaft and said blank code disk in selected angular increments;

removing a selected portion of said opaque at each angular increment by means of a selectively operated laser beam transmitter disposed above said blank code disk; and maintaining said fixed relation of said code disk and said shaft upon incorporation of said code disk and shaft in said encoder, whereby a code pattern comprised of said removed portions of said opaque layer is precisely centrically disposed relative to a rotational axis of said code disk.

2. The method of claim 1 wherein said blank code disk is connected to an angular measuring device and comprising the further step of moving said blank code disk to a specified angular position by means of said angular measuring device prior to each operation of said laser beam transmitter.

3. The method of claim 1 wherein the step of selectively operating said laser beam transmitter is further defined by operating said laser beam transmitter with a specified clock pulse frequency and comprising the additional step of rotating said blank code disk by a motor which is operated at a rotational speed in accordance with said clock pulse frequency.

4. The method of claim 1 comprising the further steps of:

coupling said blank code disk to a pattern-code master disk; and sampling a master pattern on said master code disk and converting said sampled pattern into code signals for selectively operating said laser beam transmitter.

* * * * *